United States Patent [19]
Coleby et al.
[11] 3,793,522
[45] Feb. 19, 1974

[54] TEMPERATURE COMPENSATING CIRCUITS FOR PHOTO-CONDUCTIVE CELLS

[75] Inventors: Peter Rodney David Coleby, Totton; Ian Joseph Kampel, Southbourne, both of England
[73] Assignee: U.S. Philips Corporation, New York, N.Y.

[22] Filed: Sept. 27, 1971
[21] Appl. No.: 183,784

[30] Foreign Application Priority Data
Sept. 30, 1970 Great Britain .................... 4,657/70

[52] U.S. Cl. ............... 250/206, 250/238, 307/310
[51] Int. Cl. ........................................ H01j 39/12
[58] Field of Search ... 250/206, 209, 214, 238, 218; 307/311, 310, 235; 315/32

[56] References Cited
UNITED STATES PATENTS

| | | | |
|---|---|---|---|
| 3,397,317 | 8/1968 | Dosch | 250/206 |
| 3,576,452 | 4/1971 | Smith | 250/214 |
| 3,488,506 | 1/1970 | White | 250/214 |
| 3,424,908 | 1/1969 | Sitter | 250/214 |
| 3,462,606 | 8/1969 | Case | 250/206 |

*Primary Examiner*—James W. Lawrence
*Assistant Examiner*—D. C. Nelms
*Attorney, Agent, or Firm*—Frank R. Trifari

[57] ABSTRACT

A temperature compensating circuit for a photoconductive cell whose resistance R varies with temperature and whose responsivity is a function of cell resistance. The circuit includes a transistor connected to the cell to provide a constant bias voltage thereacross so as to provide compensation for an $R^2$ resistance dependence of cell responsivity. A positive feedback circuit for the transistor controls the transistor conduction as a function of cell resistance to cause the transistor to change the level of the cell bias voltage to provide compensation for a resistance dependence of cell responsivity in excess of $R^2$, and more specifically between $R^2$ and $R^3$.

8 Claims, 3 Drawing Figures

TEMPERATURE COMPENSATING CIRCUITS FOR PHOTO-CONDUCTIVE CELLS

Figure 1:
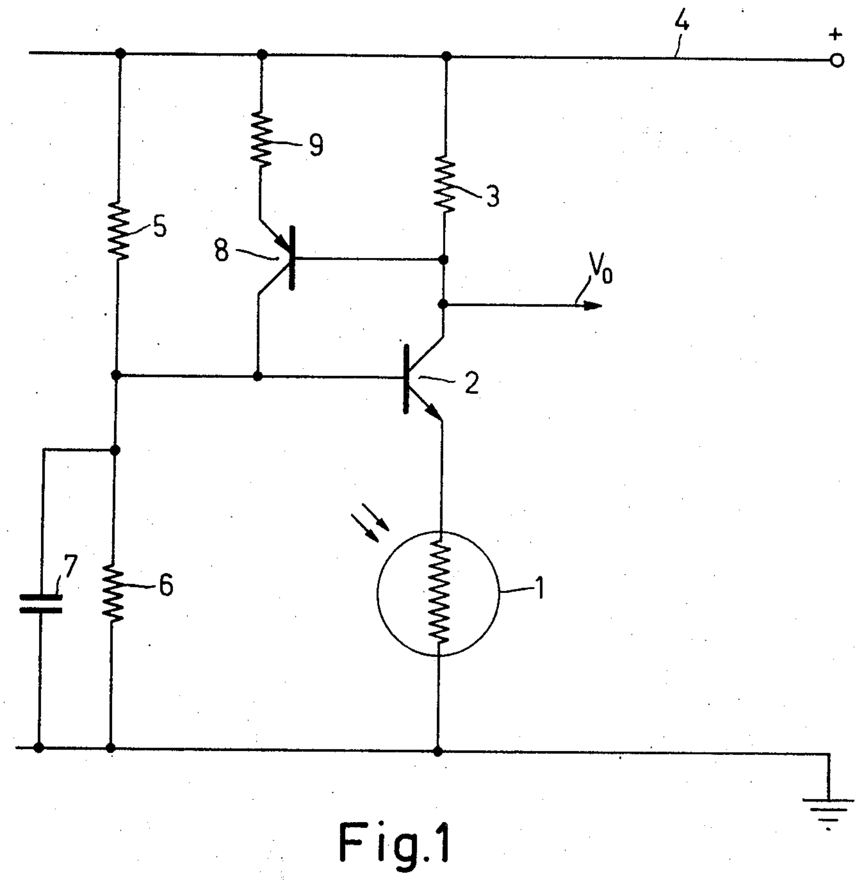

This invention relates to temperature compensating circuits for photo-conductive cells.

A photoconductive cell is a passive element which exhibits a variation in resistance as a function of light energy impinging thereon. The photoconductive cell is thus very useful for measuring light intensity or a modulation in light intensity. For this purpose, current biasing is necessary to convert the resistance value, or the change in resistance, into a corresponding voltage or current modulation. In the case of relative measurements of light, wherein a reference light intensity is present, a certain accuracy and linearity is desired, and to define these quantities the cell responsivity has been introduced as the ratio of the electric output to the incident light energy (Resp. = $dI/dL$), or the ratio of the variations of these quantities.

It is known that the responsivity of photo-conductive cells is temperature dependent, in that it is greatly dependent on cell conductance (i.e. the reciprocal of cell resistance which varies with variation in temperature) and to a lesser extent upon mobility and life-time. For some types of photo-conductive cells, for example, lead sulphide cells, the effects of mobility and life-time can be considered relatively insignificant and in the case of such cells it can be shown that the responsivity is approximately proportional to the square of the cell resistance. Thus, if such a cell is suitably biased in a constant voltage mode and signal current sampled from the cell, compensation for an $R^2$ resistance dependence can be provided, where $R$ is the cell resistance. The foregoing compensation does not take into account cell mobility and lifetime, although these contribute to cell responsivity. Therefore, $R^2$ compensation is insufficient for some types of photoconductive cells so that compensation in excess of an $R^2$ resistance dependence must be provided, e.g. $R^{2.5}$ or even $R^3$.

The foregoing will become apparent from the following equations wherein E is the voltage of the bias voltage source I is the current through the cell, R is the resistance of the cell, L is the light energy incident thereon, Resp is the cell responsivity, and dI, dR and dL are the corresponding variations in I, R and L, respectively.

$$\text{Resp} = (dI/dL) \text{ (current sampling)} \quad (1)$$

$$LR^a = K_1 \text{ (cell equation)} \quad (2)$$

$$dR\ 32 - R^{a+1}/aK_1)dL \quad (3)$$

For $a = 1$:

$$dR = -R^2K_2dL \quad (4)$$

$$I = E/R \quad (5)$$

$$dI = -E(1/R^2)dR \quad (6)$$

From equations (4) and (6):

$$dI = E\ K_2dL \quad (7)$$

From equation (7) it is seen that Resp = $K_3$. If the exponent $a$ is greater than 1, it will be necessary to compensate for a resistance dependence of the cell responsivity which is greater than the second power of cell resistance, i.e. greater than $R^2$. By providing low frequency positive feedback extra resistance compensation may be obtained which can be expressed as a resistance compensation of the cell responsivity in excess of $R^2$.

It is an object of the present invention to provide a temperature compensating circuit in which compensation for a resistance dependence in excess of $R^2$ is provided.

According to the present invention a temperature compensating circuit for a photo-conductive cell having a cell resistance (R) which varies as an inverse function of temperature and a responsivity which is a function of cell resistance comprises, in combination with such a cell, means for producing an output voltage which is a function of signal current produced by photo-conduction of the cell, means for biassing said output voltage means to provide compensation for an $R^2$ resistance dependence of cell responsivity, and further means responsive to a to change in cell resistance due to change in cell temperature to so modify the operation of the output voltage means as to compensate for resistance dependence of cell responsivity in excess of $R^2$.

In one preferred embodiment of the invention, the temperature compensating circuit can comprise an output transistor which has its base connected to receive a bias voltage such as to provide compensation for the $R^2$ resistance dependence, together with a positive feedback circuit for the transistor, in which feedback circuit a feedback voltage for controlling the conduction of the transistor is a function of cell resistance and is such as to cause the bias voltage at the transistor base to change to correct for a change of cell responsivity due to a change is cell resistance (R). Such a compensating circuit can provide compensation for a resistance dependence between the second and the third power of cell resistance, i.e. $R^2$ to $R^3$.

For obtaining compensation for a larger resistance dependence the present invention also provides, according to another aspect thereof, a temperature compensating circuit in which the photo-conductive cell is provided with a constant voltage bias to give compensation for an $R^2$ resistance dependence and in which an amplifier stage, to which signal current sampled from the cell is applied to produce said output voltage, is arranged to have a self-adjusting gain in dependence on cell resistance to provide compensation in excess of an $R^2$ resistance dependence. A single such amplifier stage can provide a further power of compensation, giving compensation for an $R^3$ resistance dependence and by the addition of further amplifier stages further powers of compensation may be achieved.

In carrying out the invention a desired compensation may be achieved only by a degradation of other cell parameters and, in general, the signal-to-noise ratio of the cell may suffer, with the degree of degradation being proportional to the degree of compensation.

Compensating circuits according to the present invention can be used for minimising signal variation over a temperature range of 20° to 40° C. Since a wide variation of cell resistance may occur over this range, it may not be possible to bias cells at their optimum for room temperature operation. Also allowance must be made for increases in current with temperature, without the risk of excessive self-heating of the cell. Thus, responsivity must be traded off against signal stability and since the signal must be compressed under ideal conditions so as to be similar to that under adverse conditions, there must be a degradation of the signal-to-noise performance.

Figure 2:
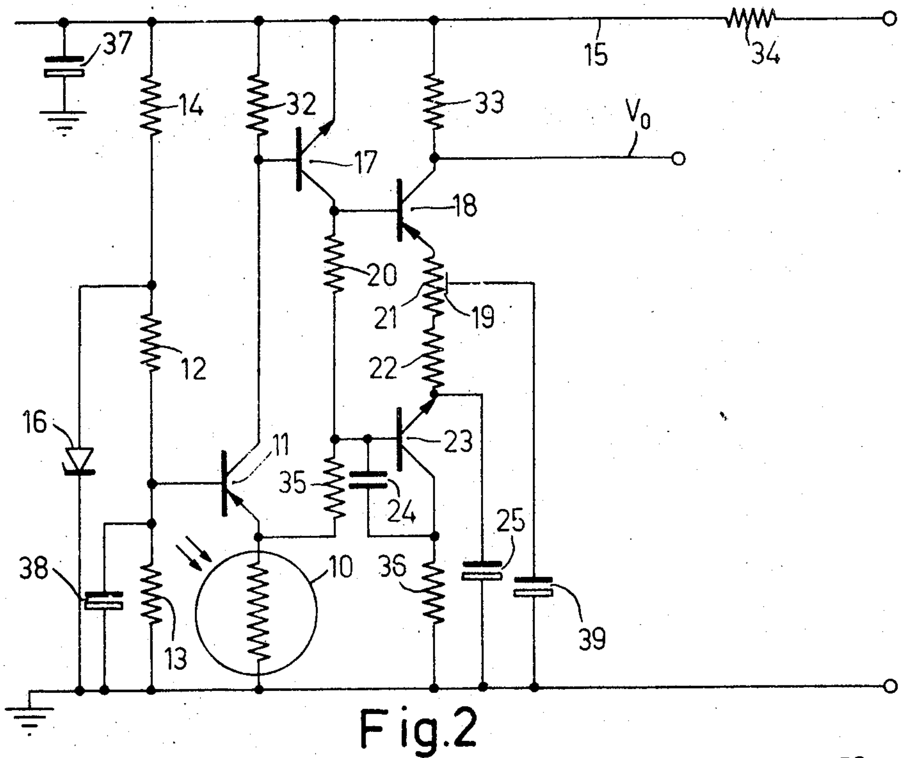
Figure 3:
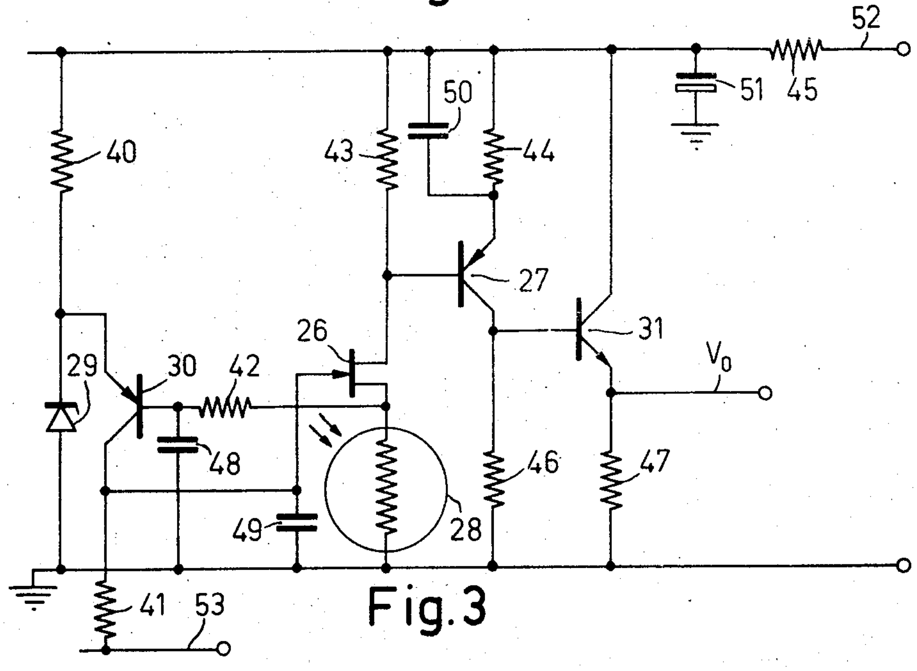

In further considering the nature of the invention reference will now be made by way of example to the accompanying drawings in which:

FIG. 1 shows a temperature compensating circuit according to the invention in which a photo-conductive cell is self biassed; and FIGS. 2 and 3 show respective compensating circuits in which the cell resistance of a photo-conductive cell is used to control amplifier gain.

Referring to FIG. 1, the temperature compensating circuit there shown comprises a photo-conductive cell 1, for example, a lead sulphide cell, which is connected between ground and the emitter of a transistor 2. The collector of transistor 2 is connected via a load resistor 3 to a voltage supply line 4. There is connected between ground and the voltage line 4 two resistors 5 and 6 which form a potential divider to provide a constant voltage bias at the base of transistor 2. The selected value of bias voltage would be calibrated dark. A capacitor 7 is connected across the resistor 6. The circuit as so far described provides in respect of cell responsivity a basic compensation for an $R^2$ resistance dependence, the conductive state of transistor 2 being determined by the level of bias voltage as modified by a change in cell output due to light impinging thereon. The signal output Vo from the circuit is taken from the collector of transistor 2. To provide self-adjusting biasing of the cell 1, the circuit comprises a transistor 8 having its emitter connected to the supply line 4 via emitter resistor 9, its base connected to the collector of transistor 2 and its collector connected to the base of transistor 2. The operation of the circuit is now as follows. A reduction in cell resistance due to an increase in ambient temperature increases the standing current in the base of transistor 2. This produces as increased voltage drop across the collector load resistor 3. Assuming that the change in the base-emitter voltage of transistor 8 is negligible, there will be a corresponding increase in the collector current of transistor 8 flowing into the base of transistor 2. This current is in a sense providing positive feedback to increase the conductive state of transistor 2, thus increasing the voltage drop across the load resistor 3 so that the signal output Vo is increased correspondingly to compensate for the change in cell responsivity.

Turning now to the temperature compensating circuit shown in FIG. 2, this circuit comprises a photo-conductive cell 10 connected in the emitter circuit of a transistor 11 which has its base connected to the junction of two resistors 12 and 13, which together with a resistor 14 provide a potential divider chain between ground and a supply line 15. A zener diode 16 is connected between ground and the junction of resistors 12 and 14 to provide a reference voltage at the base of transistor 11 and thereby hold the voltage constant across the cell 10. This constant voltage bias provides compensation for an $R^2$ resistance dependence as in FIG. 1. The greater part of the cell current is taken by a further transistor 17 rather than by transistor 11, this transistor operating at a constant current. It will be seen that the emitter current of transistor 17 is therefore approximately equal to the bias current of the cell 10. Since the gain of the amplifier second stage is dependent upon the emitter resistance ($r_e$) of transistor 17, this will be affected by the magnitude of the cell bias. To take an extreme example in order to simplify the description, let it be assumed that due to a temperature increase, the resistance of the cell 10 falls to half its room temperature value. Since cell voltage is held constant, cell current must double. The current in the emitter of transistor 17 will double, the $r_e$ of the transistor 17 will half, so that the voltage gain at transistor 17 will double. Thus compensation for an $R^3$ resistance dependence is obtained at the collector of transistor 17.

A similar technique is employed with a further transistor 18 if a set index control 19 of the amplifier is set to completely decouple the emitter resistance. The voltage developed across a resistor 20 in the collector circuit of transistor 17 is directly proportional to the cell current, and this voltage defines the current flowing in the emitter of transistor 18. Thus, considering again the previous example, a doubling of current in transistor 17 causes a doubling of voltage across resistor 20, a consequent doubling of voltage across resistors 21 and 22 and the $r_e$ of transistor 18 will half. Thus the output voltage Vo at the collector of transistor 18 will double and compensation for an $R^4$ resistance dependence is achieved. By setting the index control 19 to the other extreme, its resistance (21) tends to swamp the $r_e$ of transistor 18, so that there is a negligible change of gain at the last stage of the amplifier with current variation, and only the compensation for the $R^3$ resistance dependence is provided. Intermediate settings of the set index control 19 provide an approximation to the appropriate resistance dependence.

It is normally undesirable to allow the $r_e$ of a transistor determine the voltage gain, since variation of transistor temperature would cause a variation in $r_e$. In this control circuit cell compensation may be achieved only up to a temperature slightly in excess of about 40° and it is not advisable to take the cell to a much higher temperature under operational conditions.

The frequency performance of the circuit of FIG. 2 is limited at low frequencies by the degree of decoupling achieved at the base of a further transistor 23. Unless this is made a virtual ground there will be negative feedback to the emitter of transistor 11 and the low frequency response will suffer. This can be achieved by means of capacitors 24 and 25 connected as shown. With the circuit as shown the bandwidth is 15 to 1MHZ. Transistor 23 also provides a reference voltage for transistor 18 to operate upon without significantly bleeding cell current from transistor 17, thereby reducing any error so introduced.

It is not possible to predict the power of resistance dependence with any given photo-conductive cell: therefore, the circuit of FIG. 2 can only be set to optimum by a method of trial and error. It is necessary to make a number of temperature cycles with a cell, up to a maximum temperature of about 40°C, and adjusting the index control 19 for minimised variation. The appropriate setting may be rapidly determined on the first run and thereafter improved by successive approximation.

The temperature compensating circuit of FIG. 3 has application where compensation for an $R^3$ resistance dependence may be regarded as giving sufficient reduction of temperature variation. In this circuit, current noise at the first stage is reduced by employing a field-effect transistor 26. A transistor 27 provides gain which is proportional to current through a photo-conductive cell 28, this current being inversely proportional to cell resistance. A zener diode 29 provides a reference voltage which is referred to the cell bias voltage. A transistor 30 adjusts to take up $V_{GS}$ spreads of the field-effect transistor 26 and thereby ensures that the cell 28 is held at a constant bias voltage. A further transistor 31 is simply an emitter follower used as a buffer stage to provide a low output impedance from the circuit, the output voltage Vo being taken from the emitter of transistor 31.

Suitable components and component values for the circuits of FIGS. 1 to 3 are as follows:

FIG. 1

Photo-conductive cell 1 — Lead Sulphide Cell Mullard type 61SV

| | |
|---|---|
| Transistor | **2** — BC 109 Mullard |
| = | **8** — BCY 71 " |
| Resistor | **3** — 620 K ohms " |
| " | **5** — 200 " |
| " | **6** — 100 " |
| " | **9** — 56 " (+ 100 K ohms – trimmed) |
| Capacitor | **7** — 4.5 microfarads |
| Supply | **4** — 27 Volts |

FIG. 2

Photo-conductive cell 10 — Labyrinth InSb detectors (Mullard)

| | |
|---|---|
| Transistor | **11** — BCY 71 Mullard |
| " | **17** — BC109 " |
| " | **18** — BCY 71 " |
| " | **23** — BC109 " |
| Zener Diode | **16** — BZY88 " (C18) |
| Supply | **15** — –30 Volts |

| Resistors | | Capacitors |
|---|---|---|
| **12**—27 K ohms | **32**—3.3K ohms | **24** — 10 microfarads |
| **13**—8.2K " | **33**—1K " | **25** — 250 " |
| **14**—10K " | **34**—220 " | **37** — 250 " |
| **20**—680 " | **35**—680 " | **38** — 250 " |
| **21**—222 " | **36**—3.9K " | **39** — 250 " |
| **22**—2.2K " | | |

FIG. 3

Photo-conductive cell 28 — Labyrinth InSb detectors (Mullard)

| | |
|---|---|
| Transistors | **26** — BFW 10 Mullard |
| | **27** — BCY 71 " |
| | **30** — BCY 71 " |
| | **31** — BC 109 " |
| Zener Diode | **29** — BZY 88 " (C4V3) |
| Supply | **52** — –30 volts |
| " | **53** — –9 volts |

| Resistors | | Capacitors |
|---|---|---|
| **40**—5.6K ohms | **45**—220 ohms | **48** — 4 microfarads |
| **41**—56K " | **46**—10K " | **49** — 1 " |
| **42**—22K " | **47**—470 " | **50** — 250 picofarads |
| **43**—1.5K " | | **51** — 250 microfarads |
| **44**—39K " | | |

In each of the embodiments of FIGS. 1 to 3 a capacitor (7-FIG. 1 38-FIG. 2, and 49-FIG. 3)is provided to prevent a response of the biassing circuits to momentary changes of cell resistance as caused by pulsed or modulated radiation which the cell is normally intended to detect in use.

What we claim is:

1. A temperature compensating circuit for a photo-conductive cell having a cell resistance R which varies as an inverse function of temperature and a responsivity which is a function of cell resistance, said circuit comprising, in combination with said cell, means coupled to said cell for producing an output voltage which is a function of signal current produced by photo-conduction of the cell, means for biasing said output voltage producing means to provide compensation for an $R^2$ resistance dependence of cell responsivity, and means responsive to a change in cell resistance due to a change in cell temperature for modifying the operation of the output voltage producing means so as to compensate for resistance dependence of cell responsivity in excess of $R^2$.

2. A temperature compensating circuit as claimed in claim 1 wherein said voltage producing means comprises an output transistor with its base connected to receive a bias voltage which provides the compensation for the $R^2$ resistance dependence, and wherein said modifying means includes a positive feedback circuit for the transistor which derives a feedback voltage for controlling the conduction of the transistor as a function of cell resistance to cause the bias voltage at the transistor base to change to correct for changes of cell responsivity due to a change in cell resistance.

3. A temperature compensating circuit as claimed in claim 2, wherein said feedback circuit includes a further transistor which provides positive feedback to the base of said first mentioned transistor in response to increased conduction of the latter due to a decrease of cell resistance.

4. A temperature compensating circuit as claimed in claim 1, in which the photo-conductive cell is provided with a constant voltage bias to provide the compensation for said $R^2$ resistance dependence and said voltage producing means comprises an amplifier stage, and means for applying to said amplifier stage a signal current sampled from the cell to produce said output voltage, said amplifier stage being connected in the circuit so as to have a self-adjusting gain in dependence on cell resistance to provide said compensation in excess of an $R^2$ resistance dependence.

5. A temperature compensating circuit as claimed in claim 4, in which the gain of said amplifier stage is determined by the emitter resistance of an input transistor thereof which is connected in circuit so as to have an emitter current that is approximately equal to the bias current of the photo-conductive cell.

6. A temperature compensation circuit for a photo-conductive cell having a cell resistance R which varies inversely with temperature and a responsivity which is a function of at least the square of cell resistance, said circuit comprising, means including a transistor amplifier for applying a constant voltage bias across the cell so as to compensate for said square law resistance dependence of cell responsivity, and means responsive to a change in cell resistance due to a change in cell temperature for compensating any resistance dependence of cell responsivity in excess of the square of cell resistance and caused by said temperature change.

7. A temperature compensation circuit as claimed in claim 6 including means connection said cell to the emitter of the transistor and in series therewith across a source of supply voltage, means for applying a constant bias voltage to the base of the transistor of a value to provide compensation for the square power resistance dependence of the cell, and said compensating means comprises a second transistor connected to provide positive feedback to the base of the first transistor so as to cause the first transistor to change the cell bias voltage to correct for a change in cell responsivity due to a temperature inspired change in cell resistance.

8. A temperature compensation circuit as claimed in claim 6 including means connecting said cell to the emitter of the transistor and in series therewith across a source of supply voltage, means for applying a constant bias voltage to the base of the transistor of a value to provide compensation for the square power resistance dependence of the cell, and said compensating means comprises a second transistor connected in circuit so that its emitter current is approximately equal to the bias current in the photoconductive cell and its gain varies with the cell resistance to provide said compensation in excess of the square of cell resistance.

* * * * *

PO-1050 (5/69)

UNITED STATES PATENT OFFICE
CERTIFICATE OF CORRECTION

Patent No. 3,793,522 Dated February 19, 1974

Inventor(s) PETER RODNEY DAVID COLEBY ET AL

It is certified that error appears in the above-identified patent and that said Letters Patent are hereby corrected as shown below:

IN THE TITLE PAGE below "Foreign Application Priority Data" cancel "4,657/70"

and insert -- 46573/70 --;

Signed and sealed this 2nd day of July 1974.

(SEAL)
Attest:

EDWARD M. FLETCHER, JR.
Attesting Officer

C. MARSHALL DANN
Commissioner of Patents